US007826619B2

(12) United States Patent
Hanaoka

(10) Patent No.: US 7,826,619 B2
(45) Date of Patent: Nov. 2, 2010

(54) KEY-UPDATING METHOD, ENCRYPTION PROCESSING METHOD, KEY-INSULATED CRYPTOSYSTEM AND TERMINAL DEVICE

(75) Inventor: Yumiko Hanaoka, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1107 days.

(21) Appl. No.: 11/507,599

(22) Filed: Aug. 22, 2006

(65) Prior Publication Data
US 2007/0230705 A1    Oct. 4, 2007

(30) Foreign Application Priority Data
Aug. 23, 2005 (JP) .............................. 2005-241094
Apr. 18, 2006 (JP) .............................. 2006-114712

(51) Int. Cl.
*H04L 9/00* (2006.01)
*H04L 9/08* (2006.01)

(52) U.S. Cl. .................... 380/277; 380/278; 713/189
(58) Field of Classification Search ................. 380/277; 713/189
See application file for complete search history.

(56) References Cited

U.S. PATENT DOCUMENTS

| 5,768,389 | A * | 6/1998 | Ishii ............................. 380/30 |
| 7,093,128 | B2 * | 8/2006 | Asano et al. .................. 713/171 |
| 7,103,911 | B2 * | 9/2006 | Spies et al. ...................... 726/3 |
| 7,302,565 | B2 * | 11/2007 | Meandzija et al. ........... 713/155 |
| 2001/0023487 | A1 * | 9/2001 | Kawamoto ................... 713/202 |
| 2004/0025021 | A1 * | 2/2004 | Aikawa et al. ............... 713/172 |
| 2004/0123110 | A1 * | 6/2004 | Zhang et al. ................. 713/176 |
| 2005/0018853 | A1 * | 1/2005 | Lain et al. .................... 380/277 |
| 2005/0135610 | A1 * | 6/2005 | Chen et al. ..................... 380/30 |
| 2005/0240974 | A1 * | 10/2005 | Hiramoto et al. ............ 725/100 |

FOREIGN PATENT DOCUMENTS

| JP | 2004-254027 | 9/2004 |
| JP | 2005-260650 | 9/2005 |

OTHER PUBLICATIONS

Author: Moti Yung et al Title: Key-Insulated Public Key Cryptosystem Date: 2002.*
Menezes, et al., "Handbook of Applied Cryptography", CRC Press LLC, XP-002491478, 1997, pp. 24-25, 490-491-551-553 and 578-580.
Yevgeniy Dodis, et al., "Key-Insulated Public-Key Cryptosystems", Department of Computer Science, vol. 2332, Jun. 17, 2002, pp. 1-18.
Mihir Bellare, et al., "Protecting against Key Exposure: Strongly Key-Insulated Encryption with Optimal Threshold", Dept. of Computer Science & Engineering, May 25, 2002, pp. 1-22.

* cited by examiner

*Primary Examiner*—Minh Dieu Nguyen
(74) *Attorney, Agent, or Firm*—Oblon, Spivak, McClelland, Maier & Neustadt, L.L.P.

(57) ABSTRACT

In a key-insulated cryptosystem according to the present invention, a plurality of external devices are associated with a number of updates of a terminal secret key which has already been updated, and a different piece of secret information is stored in each of the external devices. In addition, a key-updating method in the key-insulated cryptosystem according to the present invention includes steps of: selecting one of the external devices depending on the number of updates of the terminal secret key; and causing the selected external device to generate key-updating information used for updating the terminal secret key based on the number of updates and the stored secret information.

3 Claims, 10 Drawing Sheets

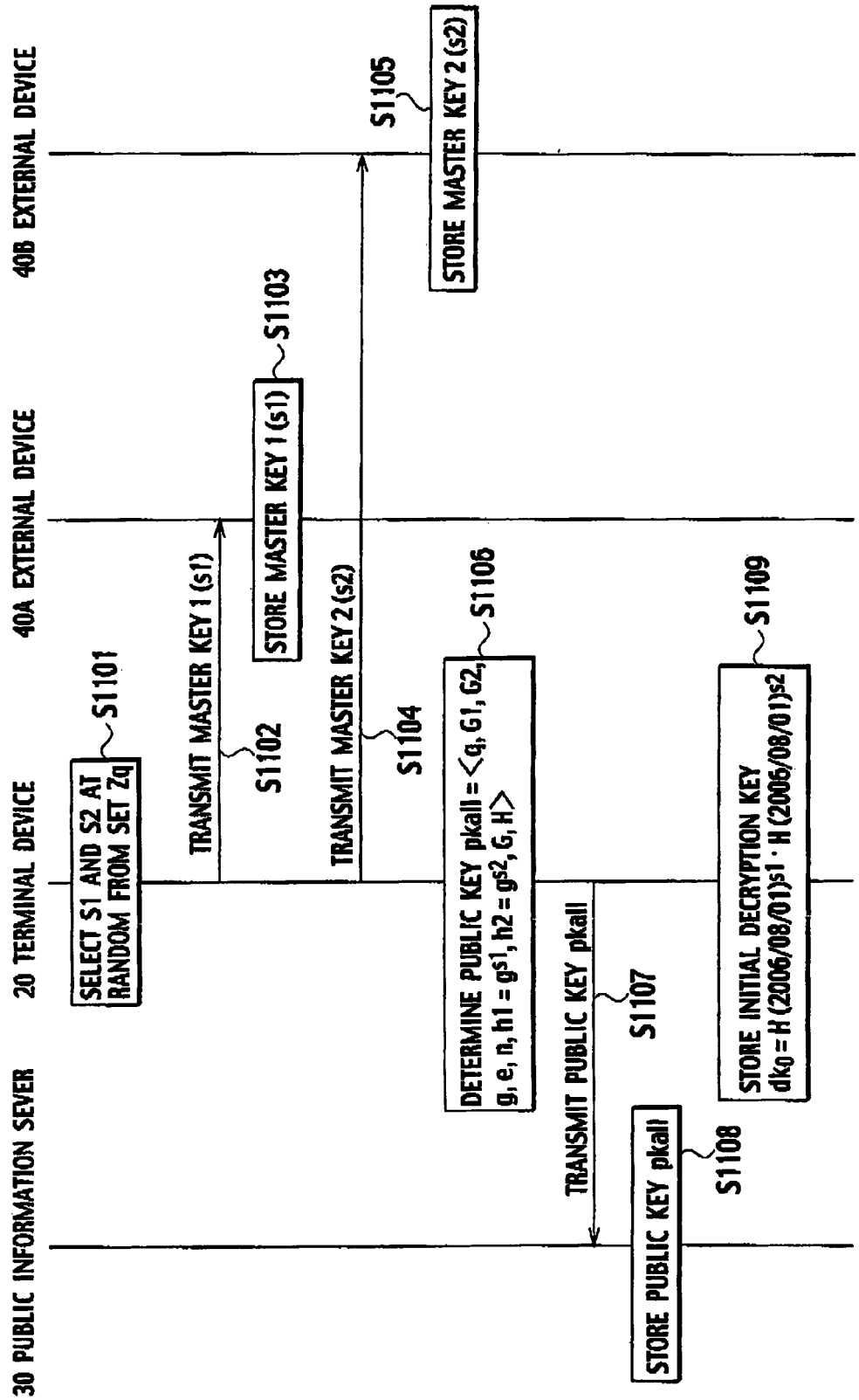

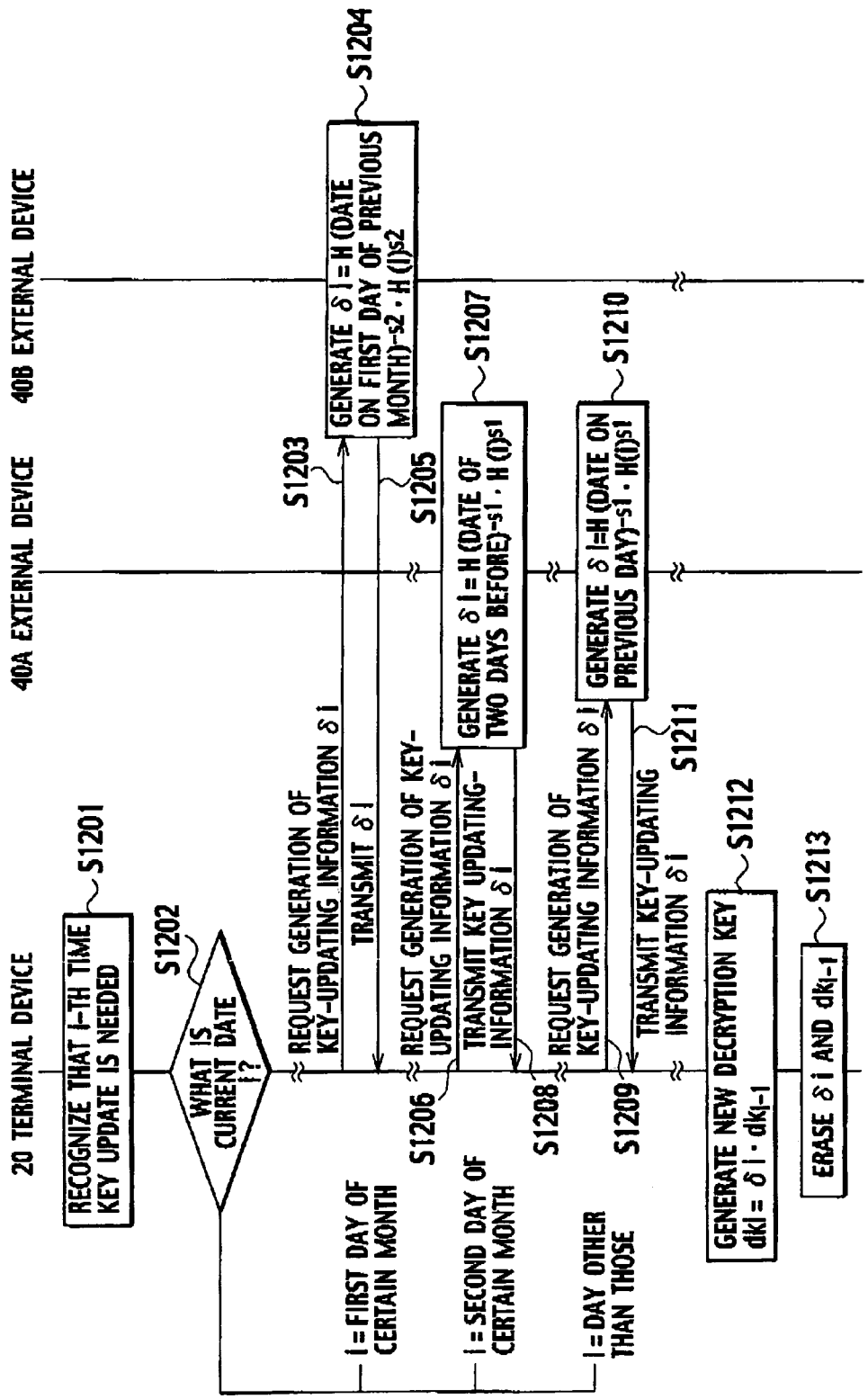

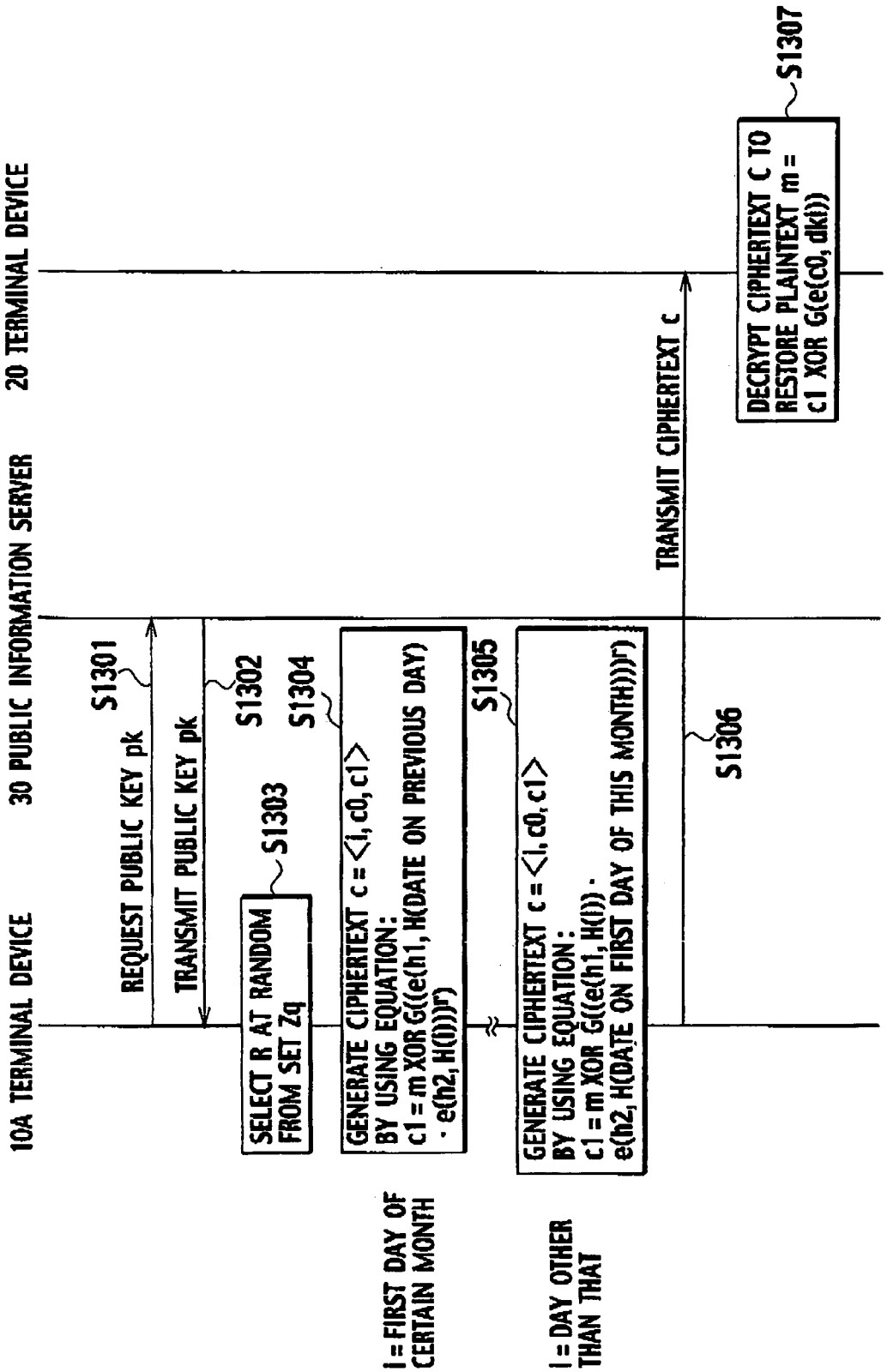

KEY-UPDATING METHOD, ENCRYPTION PROCESSING METHOD, KEY-INSULATED CRYPTOSYSTEM AND TERMINAL DEVICE

CROSS REFERENCE TO RELATED APPLICATIONS

This application is based upon and claims the benefit of priority from the prior Japanese Patent Applications No. P2005-241094, filed on Aug. 23, 2005 and No. P2006-114712, filed on Apr. 18, 2006; the entire contents of which are incorporated herein by reference.

BACKGROUND OF THE INVENTION

1. Field of the Invention

The present invention relates to a key-updating method in a key-insulated cryptosystem, encryption processing method, a key-insulated cryptosystem, and a terminal device used in the key-insulated cryptosystem.

2. Description of the Related Art

Along with progress of so-called information technology (IT), a cryptosystem for carrying out encryption processing of information to be transmitted and received has been widely used in these days.

In such a cryptosystem, there is a problem that security of information to be encrypted cannot be secured when a cryptographic algorithm used for the encryption processing is once analyzed.

However, in reality, rather than the case where the cryptographic algorithm is analyzed, there is a problem that a key used for encryption processing is exposed outside due to carelessness of a user who uses the cryptosystem.

Therefore, to cope with such key exposure, so-called "key-insulated cryptosystem" has been known (see, for example, Y. Dodis, J. Katz, S. Xu and M. Yung, "Key-Insulated Public-Key Cryptosystems", Proc. of Eurocrypt 2002, Lecture Notes in Computer Science Vol. 2332, 2002, Springer-Verlag, P. 65-82 (hereinafter referred to as "Reference Document 1"), and M. Bellare and A. Palacio, "Protecting against Key Exposure: Strongly Key-Insulated Encryption with Optimal Threshold", Cryptology ePrint Archive 064, the Internet URL:http://eprint.iacr.org/2002 (hereinafter referred to as "Reference Document 2"). In the key-insulated cryptosystem, it is possible to decrypt information which is encrypted by other users in the key-insulated cryptosystem for a predetermined time period, by using a user decryption key stored in a terminal device connected to a communications network.

In addition, in the key-insulated cryptosystem, "key-updating information" is generated by using "secret information" stored in an external device (for example, an IC card) connected to a terminal device. A user of the terminal device can update the user decryption key used in the terminal device by using the key-updating information.

That is, one of great features in the key-insulated cryptosystem is as follows. Even in a case where some of the user decryption keys, which are applied for a certain time period, are exposed outside, as long as the total number of the exposed decryption keys does not exceed a certain number, the decryption keys, which are applied for a time period other than the time period during which the exposed key is applied, are still unknown to persons and systems other than the user. That is, security in the time period other than the time period, during which the exposed decryption key is applied, is not affected at all.

Here, a specific configurational example of a key-insulated cryptosystem will be briefly described. For example, an update interval of a user decryption key is assumed to be one day, and the key is assumed to be updated for (N-1) times, that is, for N days.

A user (a terminal device) in the key-insulated cryptosystem uses general public-key encryption (for example, RSA encryption and ElGamal encryption) to generate N pairs of a public key and a decryption key $((Pk_i, Sk_i)_{1 \leq i \leq N})$ and to publish $pk=(pk_i)_{0 \leq i \leq N}$ as a public key.

In addition, the user (the terminal device) stores $dk_0=sk_0$ as an initial decryption key. Furthermore, the decryption key $sk=(sk_i)_{0 \leq i \leq N}$ is set as a master key hk* (secret information), and the master key hk* is enclosed in an external device (for example, a tamper-proof region in an IC card or the like).

For example, at the j-th time key update, the external device generates key-updating information $d_j=sk_j$ based on the master key hk* and the fact that it is the j-th time key update. The generated key-updating information $d_j$ is transmitted to the terminal device connected with a secured communications path.

The user (the terminal device) generates a new decryption key $dk_j=d_j$ by using the key-updating information $d_j$ and erases the previous decryption keys $dk_{j-1}$ and $d_j$.

SUMMARY OF THE INVENTION

However, the above-described conventional key-insulated cryptosystem has the following problems. Specifically, there is a problem that a user cannot flexibly update a decryption key, since an external device used by the user in the key-insulated cryptosystem is basically only one.

For example, in a case where the external device is kept at a user's home, the user cannot update a decryption key while the user is not home.

A case where the user carries an external device can be considered, but this raises another problem that the key-insulated cryptosystem is compromised when a decryption key is lost or stolen. In addition, a case where a plurality of external devices are prepared can be considered, and an identical master key hk* (secret information) is enclosed in each of the external devices. However, even in this case, since the key-insulated cryptosystem is compromised when any of the external devices is lost or stolen, security of encrypted information is deteriorated as compared with a case where the only one external device is prepared.

The present invention has been made in view of the forgoing situations. Accordingly, it is an object of the present invention to provide a key-updating method, an encryption processing method, a key-insulated cryptosystem, and a terminal device, which can more flexibly carry out a key update without deteriorating security of encrypted information.

To solve the above-described problems, the present invention has the following aspects. First of all, a first aspect of the present invention has a feature as follows. In a key-updating method in a key-insulated cryptosystem, the key-insulated cryptosystem is provided with: a terminal device (a terminal device 20) for carrying out encryption processing; and an external device which is used for updating a terminal secret key (for example, a decryption key $dk_j$) stored in the terminal device and which stores secret information that is a secret key selected from a predetermined number of pairs of a public key and a secret key. In the key-updating method, the plurality of external devices (external devices 40A and 40B) are associated with the number of updates of the terminal secret key which has already been updated (for example, whether the number of updates is odd-numbered or even-numbered), and a different piece of secret information (a master key $hk^*_{odd}$ or a master key $hk^*_{even}$) is stored in each of the external devices.

The key-updating method includes: a step of selecting the external device depending on the number of updates; and a step of causing the selected external device to generate key-updating information being used for updating the terminal secret key based on the number of updates and the stored secret information.

In this aspect, a plurality of different external devices are associated with the number of updates of the terminal secret key which has already been updated, and a different piece of secret information is stored in each of the external devices. That is, a user of the terminal device can selectively use the external devices which are installed at a plurality of different places by connecting the external devices associated with the number of updates of the terminal secret key. In addition, since a different piece of secret information is stored in each of the external devices, a certain number of decryption keys cannot be obtained even in a case where any of the external devices is lost or stolen. Thus, security of the key-insulated cryptosystem can be maintained.

That is, in this aspect, key updates can be more flexibly carried out without deteriorating the security of the encrypted information.

A second aspect of the present invention, which is related to the first aspect of the present invention, has a feature as follows. The terminal device further includes a step of obtaining external device identification information from the external device for uniquely identifying the external device. In the step of selecting the external device, it is determined whether or not an external device connected to the terminal device is an external device to which a request for an update of the terminal secret key should be made, based on the external device identification information and the number of updates.

A third aspect of the present invention has a feature as follows. A key-insulated cryptosystem is provided with: a terminal device (a terminal device 20) for carrying out encryption processing; and an external device which is used for updating a terminal secret key (for example, a decryption key $dk_j$) stored in the terminal device and which stores secret information that is a secret key selected from a predetermined number of pairs of a public key and a secret key. In the key-insulated cryptosystem, the plurality of external devices (the external devices 40A and 40B) are associated with the number of updates of the terminal secret key which has already been updated (for example, whether the number of updates is odd-numbered or even-numbered), and a different piece of secret information (a master key hk*odd or a master key $hk^*_{even}$) is stored in each of the external devices. The terminal device is provided with: an external device identification information obtaining unit (an update unit 205) configured to obtain external device identification information from the external device for uniquely identifying the external device; and an external device determination unit (the update unit 205) configured to determine whether or not an external device (for example, the external device 40A) connected to the terminal device is an external device to which a request for an update of the terminal secret key should be made, based on the external device identification information obtained by the external device identification information obtaining unit and the number of updates. The external device is provided with a key-updating information generating unit (a key-updating information generating unit 403) configured to generate key-updating information (for example, $d_j$) used for updating the terminal secret key based on the number of updates and the stored secret key information.

A fourth aspect of the present invention has a feature as follows. A terminal device is connected to an external device storing secret information that is a secret key selected from a predetermined number of pairs of a public key and a secret key, and the terminal device is used in a key-insulated cryptosystem. The plurality of external devices are associated with the number of updates of the terminal secret key which has already been updated. A different piece of secret information is stored in each of the external devices. The terminal device includes: an external device identification information obtaining unit configured to obtain external device identification information from the external device for uniquely identifying the external device; and an external device determination unit configured to determine whether or not an external device connected to the terminal device is an external device to which a request for an update of the terminal secret key should be made, based on the external device identification information obtained by the external device identification information obtaining unit and the number of updates of the terminal secret key which has already been updated.

In addition, the present invention includes the following aspect. A fifth aspect of the present invention has a feature as follows. In an encryption processing method in a key-insulated cryptosystem, the key-insulated cryptosystem is provided with: a terminal device (for example, a terminal device 10A) for carrying out encryption processing; and external devices (external devices 40A and 40B) each used for updating a terminal secret key (for example, a decryption key $dk_j$) stored in the terminal device and which store secret information that is a secret key selected from a predetermined number of pairs of a public key and a secret key. The key-insulated cryptosystem includes at least a first external device (the external device 40A) and a second external device (the external device 40B). The first and second external devices are associated with the number of updates of the terminal secret key which has already been updated (for example, whether the number of updates is odd-numbered or even-numbered). The first and second external devices respectively store different pieces of secret information (a master key $hk^*_{odd}$ or master key $hk^*_{even}$). The encryption processing method includes: a step of selecting any of the first and second external devices depending on the number of updates; a step of causing the selected first or second external device to generate key-updating information (for example, $d_j$) used for updating the terminal secret key based on the number of updates and the stored secret information; a step of updating the terminal secret key to a post-first-update terminal secret key (a decryption key $dk_{j-1}$) by using the key-updating information generated by the first external device; a step of updating the terminal secret key to a post-second-update terminal secret key (a decryption key $dk_j$) by using the key-updating information generated by the second external device at the timing of an update immediately once the post-first-update terminal secret key is generated; a step of causing the terminal device to encrypt information (a plaintext m) by using a first public key (a public key $pk_{j-1}$) corresponding to the post-first-update terminal secret key and a second public key (a public key $pk_j$) corresponding to the post-second-update terminal secret key; and a step for causing another terminal device (for example, the terminal device 20) different from the terminal device to decrypt the information by using the post-first-update terminal secret key and the post-second-update terminal secret key.

In this aspect, information is encrypted by using both public keys which are a public key (the second public key) corresponding to the number of updates of a terminal secret key and a public key (the first public key) corresponding to a period immediately before the public key. In addition, the encrypted information cannot be decrypted unless using both decryption keys which are the post-second-update terminal secret key and the post-first-update terminal secret key that is immediately before the post-second-update terminal secret key.

Therefore, even in a case where any of the first and second external devices is lost or stolen, an attacker who obtains the external device cannot decrypt the encrypted information at all even by using the external device, thus security of the key-insulated cryptosystem can be further improved.

A sixth aspect of the present invention, which is related to the fifth aspect of the present invention, has a feature as follows. The terminal device further includes a step of obtaining external device identification information for uniquely identifying the first external device and external device identification information for uniquely identifying the second external device, respectively from the first and second external devices. In the step of selecting any one of the first or second external device, it is determined whether or not an external device connected to the terminal device is an external device to which a request for an update of the terminal secret key should be made, based on the external device identification information and the number of updates.

A seventh aspect of the present invention, which is related to the fifth aspect of the present invention, has a feature as follows. The first external device is associated with a first cycle for generating key-updating information, the second external device is associated with a second cycle for generating key-updating information, the second cycle being shorter than the first cycle. In the step of selecting any one of the first and second external devices, any one of the first and second external devices is selected depending on an update period of the terminal secret key. In the step of generating the key-updating information, any one of the first and second external devices generates the key-updating information, based on the update period and the stored secret information. In the step of updating the terminal secret key to a post-second-update terminal secret key, the terminal device updates the terminal secret key to a post-second-update terminal secret key by using the key-updating information generated by the second external device.

An eighth aspect of the present invention, which is related to the fifth aspect of the present invention, has a feature as follows. In the encrypting step, the terminal device encrypts the information by using a public key corresponding to the terminal secret key and by using update period information indicating the update period.

A ninth aspect of the present invention, which is related to the fifth aspect of the present invention, has a feature as follows. G1 and G2 are set as a group where an order is q, g is set as a generator of the G1, e:G1×G2→G2 is set as a bilinear mapping satisfying $e(g^a, g^b)=e(g, g)^{ab}$. The key-updating information is generated by using a hash function determined based on the bilinear mapping.

A tenth aspect of the present invention has a feature as follows. A key-insulated cryptosystem is provided with: terminal devices (for example, terminal devices 10A and 20) each for carrying out encryption processing; and external devices (for example, external devices 40A and 40B) which are used for updating a terminal secret key (for example, a decryption key $dk_j$) stored in the terminal device and which store secret information that is a secret key selected from a predetermined number of pairs of a public key and a secret key. The key-insulated cryptosystem includes at least a first external device (the external device 40A) and a second external device (the external device 40B). The first and second external devices are associated with the number of updates of the terminal secret key which has already been updated (for example, whether the number of updates is odd-numbered or even-numbered). A different piece of secret information (a master key $hk^*_{odd}$ or a master key $hk^*_{even}$) is stored in each of the first and second external devices. The first and second external devices are provided with a key-updating information generating (a key-updating information generating unit 403) configured to generate key-updating information (for example, $d_j$) used for updating the terminal secret key based on the number of updates and the stored secret information. The terminal devices are provided with: an external device identification information obtaining unit (an update unit 205) configured to obtain external device identification information for uniquely identifying the first external device and external device identification information for uniquely identifying the second device, respectively from the first and second external devices; an external device determination unit (an update unit 205) configured to determine whether or not an external device connected to the terminal device is an external device to which a request for an update of the terminal secret key should be made, based on the external device identification information obtained by the external device identification information obtaining unit and the number of updates; and an encryptor (an encryptor 105) configured to encrypt information (a plaintext m) by using the first public key (the public key $pk_{j-1}$) and the second public key (the public key $pk_j$), the first public key corresponding to the post-first-update terminal secret key (the decryption key $dk_{j-1}$) which is the terminal secret key updated by using the key-updating information generated by the first external device, and the second public key corresponding to the post-second-update terminal secret key (the decryption key $dk_j$) which is the terminal secret key updated by using the key-updating information generated by the second external device at the timing of an update immediately once the post-first-update terminal secret key is generated.

An eleventh aspect of the present invention, which is related to the tenth aspect of the present invention, has a feature as follows. The terminal devices further include a decryptor (a decryptor 209) configured to decrypt the information by using the post-first-update terminal secret key and the post-second-update terminal secret key.

A twelfth aspect of the present invention, which is related to the tenth aspect of the present invention, has a feature as follows. The first external device is associated with a first cycle for generating key-updating information, the second external device is associated with a second cycle for generating key-updating information, and the second cycle being shorter than the first cycle. The external device determination unit selects any one of the first and second external devices depending on an update period of the terminal secret key. The key-updating information generator causes any one of the first and second external devices to generate the key-updating information, based on the update period and the stored secret information. The encryptor encrypts the information by using a public key corresponding to the terminal secret key and by using update period information indicating the update period.

A thirteenth aspect of the present invention has a feature as follows. Terminal devices (for example, terminal devices 10A and 20) are connected to external devices (for example, external devices 40A and 40B) storing secret information that is a secret key selected from a predetermined number of pairs of a public key and a secret key, and the terminal devices are used in a key-insulated cryptosystem. The external devices include at least a first external device (the external device 40A) and a second external device (the external device 40B). The first and second external devices are associated with the number of updates of the terminal secret key which has already been updated (for example, whether the number of updates is odd-numbered or even-numbered). A different piece of secret information (a master key hk*$_{odd}$ or a master key hk*$_{even}$) is stored in each of the first and second external devices. The terminal device includes: an external device identification information obtaining unit (an update unit 205) configured to obtain external device identification information for uniquely identifying the first external device and external device identification information for uniquely identifying the second external device, respectively from the first and second external devices; an external device determination unit (the update unit 205) configured to determine whether or not an external device connected to the terminal device is an external device to which a request for an update of the terminal secret key should be made, based on the external device identification information obtained by the external device identification information obtaining unit and the number of updates of the terminal secret key which has already been updated; and an encryptor (an encryptor 105) configured to encrypt information (a plaintext m) by using a first public key (a public key pk$_{j-1}$) and a second public key (a public key pk$_j$), the first public key corresponding to a post-first-update terminal secret key (a decryption key dk$_{j-1}$) which is the terminal secret key updated by using the key-updating information generated by the first external device, and a second public key corresponding to a post-second-update terminal secret key (a decryption key dk$_j$) which is the terminal secret key updated by using the key-updating information generated by the second external device at the timing of an update immediately once the post-first-update terminal secret key is generated.

A fourteenth aspect of the present invention, which is related to the ninth aspect of the present invention, has a feature as follows. A decryptor (a decryptor 209) configured to decrypt the information by using the post-first-update terminal secret key and the post-second-update terminal secret key is further included.

A fifteenth aspect of the present invention, which is related to the ninth aspect of the present invention, has a feature as follows. The first external device is associated with a first cycle for generating key-updating information, the second external device is associated with a second cycle for generating key-updating information, and the second cycle being shorter than the first cycle. The external device determination unit selects any one of the first and second external devices depending on an update period of the terminal secret key. The encryptor encrypts the information by using a public key corresponding to the terminal secret key and by using update period information indicating the update period.

A sixteenth aspect of the present invention, which is related to the ninth aspect of the present invention, has a feature as follows. G1 and G2 are set as a group where an order is q, g is set as a generator of the G1, e:G1×G2→G2 is set as a bilinear mapping satisfying e(g$^a$, g$^b$)=e(g, g)$^{ab}$. The key-updating information is generated by using a hash function determined based on the bilinear mapping.

According to the aspects of the present invention, it is possible to provide a key-updating method, an encryption processing method, a key-insulated cryptosystem, and a terminal device, which can more flexibly carry out a key update without deteriorating security of encrypted information.

BRIEF DESCRIPTION OF THE DRAWINGS

FIG. 10 is an operational flowchart of the key-insulated cryptosystem according to the third embodiment of the present invention.

FIG. 11 is an operational flowchart of the key-insulated cryptosystem according to the third embodiment of the present invention.

FIG. 12 is an operational flowchart of the key-insulated cryptosystem according to the third embodiment of the present invention.

DESCRIPTION OF THE PREFERRED EMBODIMENTS

First Embodiment

Figure 1:
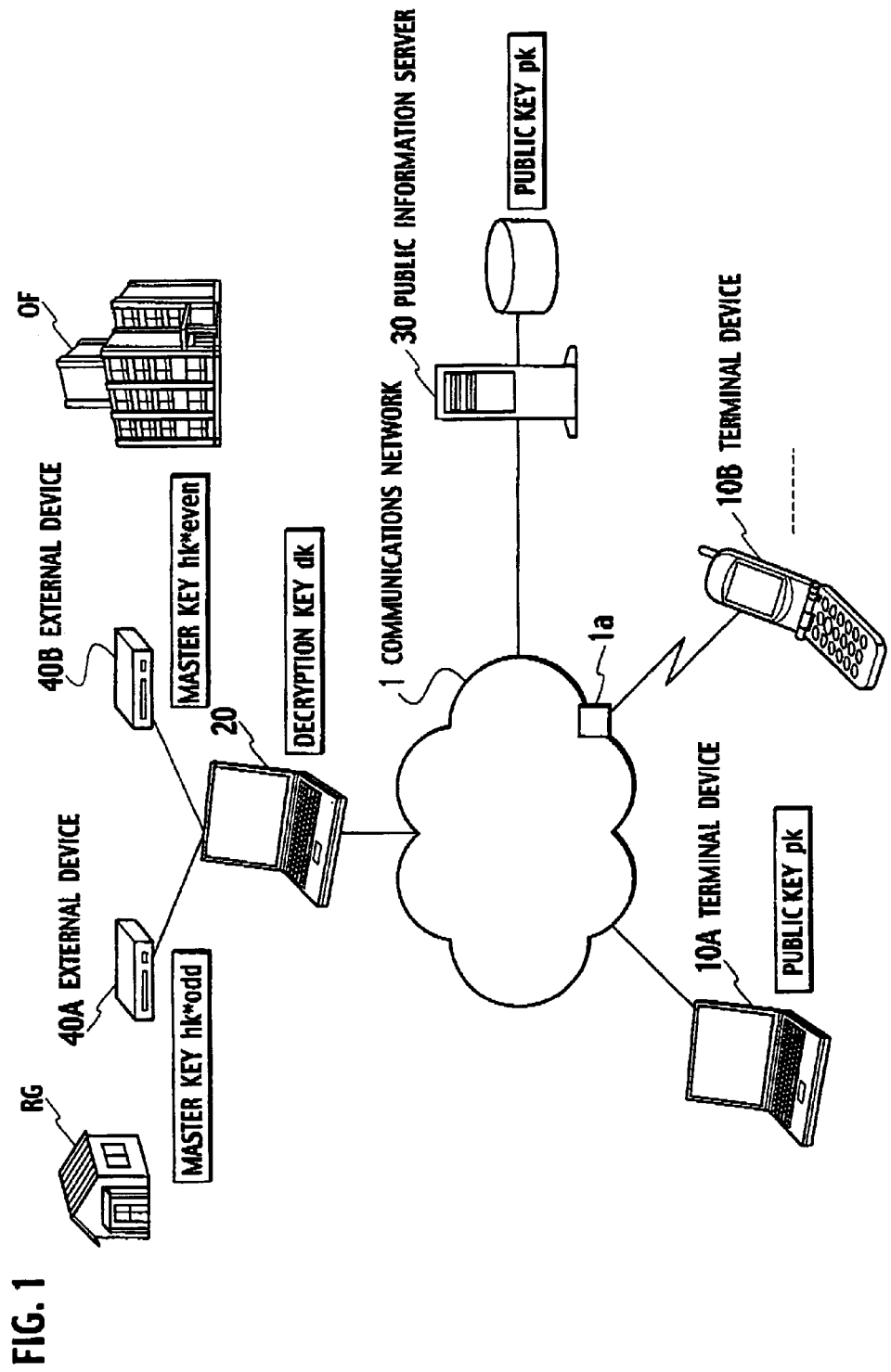
FIG. 1 is a general schematic configurational diagram of a key-insulated cryptosystem according to a first embodiment of the present invention.

Next, the first embodiment of the present invention will be described. It should be noted that, in the description of the following drawings, identical or similar portions are denoted by identical or similar reference numerals. However, it should be noted that the drawings are schematic and that proportions of respective sizes and the like are different from the actual ones.

Therefore, specific sizes and the like should be judged by referring to the following description. In addition, portions different in relation and proportion of respective sizes among the drawings are of course included.

(General Schematic Configuration of Key-Insulated Cryptosystem)

FIG. 1 is a general schematic configurational diagram of a key-insulated cryptosystem according to the present embodiment. As shown in FIG. 1, the key-insulated cryptosystem according to the present embodiment is configured with terminal devices 10A and 10B, a terminal device 20, a public information server 30, and external devices 40A and 40B.

The terminal devices 10A and 10B, the terminal device 20, and the public information server 30 are connected to a communications network 1.

In the key-insulated cryptosystem according to the present embodiment, by use of a user decryption key dk (a terminal secret key) which is stored in the terminal device 20 (the terminal device) connected to the communications network 1, information which is encrypted by a transmission terminal (for example, the terminal device 10A) used by another user in the key-insulated cryptosystem can be decrypted only for a predetermined time period.

It should be noted that, in the key-insulated cryptosystem according to the present embodiment, the encryption processing of information to be transmitted and received is carried out in accordance with the encryption scheme described in the above-described Reference Document 1 or 2.

The terminal devices 10A and 10B encrypt a plaintext m by using a user public key pk of the terminal device 20, and transmit a ciphertext c, which is encrypted from the plaintext m, to the terminal device 20.

The terminal device 20 receives the ciphertext c which is transmitted by the terminal device 10A (or 10B), and decrypts the received ciphertext c to the plaintext m by using the user decryption key dk of the terminal device 20. In the present embodiment, the terminal devices 10A and 10B and the terminal device 20 configure a terminal device for carrying out encryption processing.

What may be needed as the terminal devices 10A and 10B and the terminal device 20 include a personal computer and PDA (personal digital assistant), each of which is provided with a communications interface for accessing the communications network 1.

In addition, as the terminal device like the terminal device 10B, a mobile communications terminal (for example, a cellular telephone terminal) capable of accessing the communications network 1 via a radio base station 1a may be used.

The public information server 30 publishes the user public key pk of the terminal devices 10A and 10B and the terminal device 20, which configure the key-insulated cryptosystem, via the communications network 1.

Each of the external devices 40A and 40B stores a master key hk* (secret information) used for updating the user decryption key dk of the terminal device 20, the user decryption key dk being stored in the terminal device 20. In the present embodiment, the external device 40A is installed at a user's home RG. In addition, the external device 40B is installed at an office OF.

The master key hk* is a secret key selected from a predetermined number of pairs of a public key and a secret key by using general public key encryption (for example, RSA encryption and ElGamal encryption). The master key hk* is used for generating key-updating information d for updating the user decryption key dk (the terminal secret key) of the terminal device 20.

In the present embodiment, the external devices 40A and 40B, i.e., a plurality of external devices are associated with the number of updates of the decryption key dk which has already been updated.

In addition, in the external devices 40A and 40B, different master keys hk* (specifically, a master key hk*$_{odd}$ and a master key hk*$_{even}$) are respectively stored. It should be noted that details of the master keys hk* stored in the external devices 40A and 40B will be described later.

Each of the external devices 40A and 40B can be configured with, for example, an IC card having a tamper-proof region and an IC card reader/writer. In addition, in a case where the terminal device is a mobile communications terminal, a charger of the terminal device may be configured to include functions of the external device 40A (40B).

(Logical Block Configuration of Key-Insulated Cryptosystem)

Next, logical block configurations of the terminal device 10A (10B), the terminal device 20, the public information server 30, and the external device 40A (40B), which configure the key-insulated cryptosystem according to the present embodiment, will be described below.

(1) Terminal Device 10A

Figure 2:
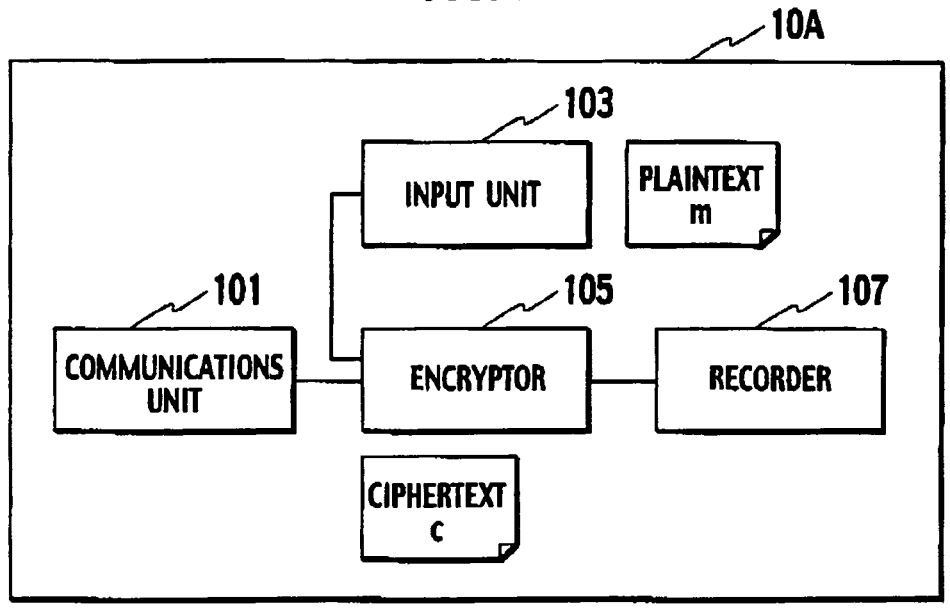
FIG. 2 is a logical block configurational diagram of a terminal device to transmit a ciphertext according to the first embodiment of the present invention.

FIG. 2 is a logical block diagram of the terminal device 10A. The terminal device 10B also has a configuration similar to that of the terminal device 10A. It should be noted that since portions related to the present invention will be mainly described, there is a case where the terminal device 10A is provided with a logical block necessary for implementing functions of the terminal device 10A (such as a voice communications unit), which is not shown or whose description is omitted (this is also the case of the terminal device 20, the public information sever 30, and the external device 40A, which will be described below).

As shown in FIG. 2, the terminal device 10A is provided with a communications unit 101, an input unit 103, an encryptor 105, and a recorder 107.

The communications unit 101 provides a communications interface for connecting to the communications network 1. In addition, the communications unit 101 relays a ciphertext c and the like which are transmitted by the encryptor 105.

The input unit 103 is an interface (for example, a drive device for a keyboard or a data recording medium) for inputting a plaintext m which is to be encrypted in the encryptor 105.

The encryptor 105 encrypts the plaintext m, which is inputted by the input unit 103, to generate a ciphertext c. Specifically, the encryptor 105 obtains a user public key pk of the terminal device 20, the key being published on the public information server 30, and encrypts the plaintext m by using the obtained user public key pk of the terminal device 20.

The recorder 107 records the user public key pk and the like of the terminal device 20, which are obtained from the public information server 30.

(2) Terminal Device 20

Figure 3:
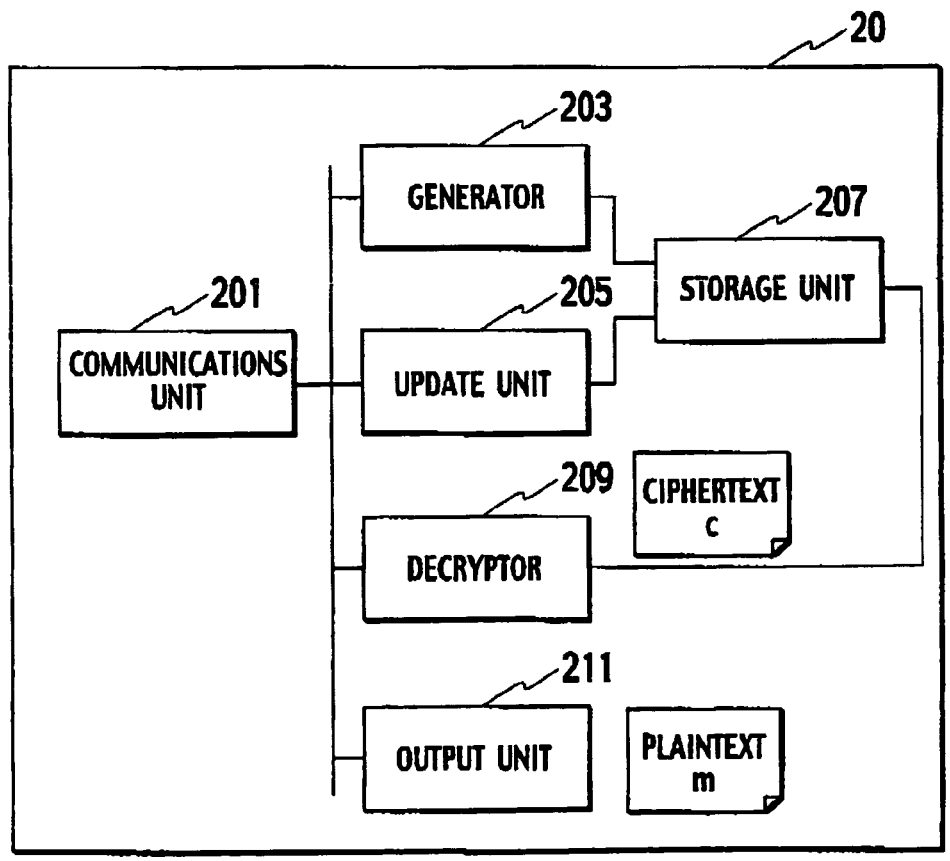
FIG. 3 is a logical block configurational diagram of a terminal device to receive a ciphertext according to the first embodiment of the present invention.

FIG. 3 is a logical block diagram of the terminal device 20. As shown in FIG. 3, the terminal device 20 is provided with a communications unit 201, a generator 203, an update unit 205, a storage unit 207, a decryptor 209, and an output unit 211.

The communications unit 201 provides a communications interface for connecting to the communications network 1. In addition, the communications unit 201 is connected to the generator 203, the update unit 205, the decryptor 209, and the output unit 211, in order to relay key-updating information d, a decryption key dk, and the like, which are transmitted and received among the logical blocks.

The generator 203 generates a predetermined number of pairs of a public key and a secret key by using general public-key encryption (for example, RSA encryption and ElGamal encryption).

The update unit 205 updates a user decryption key dk of the terminal device 20. Specifically, the update unit 205 updates the decryption key dk by using the key-updating information d which is generated by the external device 40A or the external device 40B.

In particular, in the present embodiment, the external device 40A is associated with odd-numbered updates of the decryption key dk. On the other hand, the external device 40B is associated with even-numbered updates of the decryption key dk.

In addition, the update unit 205 can obtain external device identification information from the external devices for uniquely identifying the external devices 40A and 40B. In the present embodiment, the update unit 205 configures an external device identification information obtaining unit.

Furthermore, the update unit 205 can determine whether or not an external device connected to the terminal device 20 is an external device to which a request for an update of the decryption key dk should be made, based on the obtained external device identification information and the number of updates for which the user decryption key dk of the terminal device 20 (the terminal secret key) has already been updated. In the present embodiment, the update unit 205 configures an external device determination unit.

The storage unit 207 stores: a predetermined number of pairs of a public key and a secret key which are generated by the generator 203; the user decryption key dk of the terminal device 20; and the like.

The decryptor 209 decrypts a ciphertext c which is transmitted by the terminal device 10A (10B). Specifically, the decryptor 209 decrypts the ciphertext c by using the user decryption key dk of the terminal device 20, the key being stored in the storage unit 207. The decryptor 209 can store a plain text m which is restored by decrypting the ciphertext c in the storage unit 207, and can output the plaintext m to the output unit 211.

The output unit 211 outputs the plaintext m or the like, which is obtained by decrypting the ciphertext c. For example, the output unit 211 is configured with a liquid crystal display for displaying contents of the plaintext m and the like, and with a drive device for recording data of the plaintext m and the like on a recording medium (for example, a memory card).

It should be noted that, in the present embodiment, the terminal device 10A (10B) and the terminal device 20 have different logical blocks. However, the terminal device 10A (10B) may include the logical block of the terminal device 20 in addition to the logical block of the terminal device 10A. Similarly, the terminal device 20 may include the logical block of the terminal device 10A in addition to the logical block of the terminal device 20.

(3) Public Information Server 30

Figure 4:
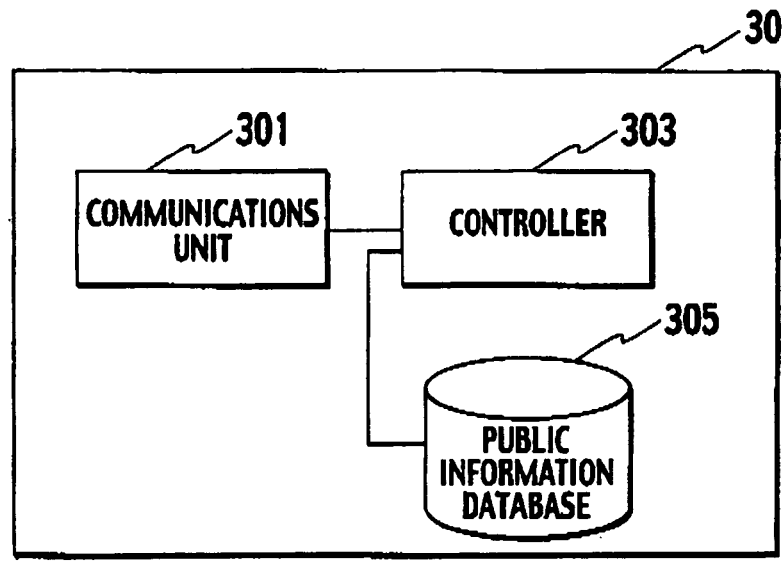
FIG. 4 is a logical block configurational diagram of a public information server according to the first embodiment of the present invention.

FIG. 4 is a logical block diagram of the public information server 30. As shown in FIG. 4, the public information server 30 is provided with a communications unit 301, a controller 303, and a public information database 305.

The communications unit 301 provides a communications interface for connecting to the communications network 1. In addition, the communications unit 301 relays a user public key pk of the terminal device 20 or the like, which is transmitted by the controller 303.

The controller 303 stores the user public key pk of the terminal device 20 or the like, which is transmitted by the terminal device 20, in the public information database 305. In addition, the controller 303 transmits the user public key pk of the terminal device 20 or the like, which is stored in the public information database 305, in response to a request from the terminal device 10A or the like.

The public information database 305 stores the user public key pk of the terminal device 20 or the like, and forms a public information database configured with the user public key pk in the key-insulated cryptosystem.

(4) External Device 40A

Figure 5:
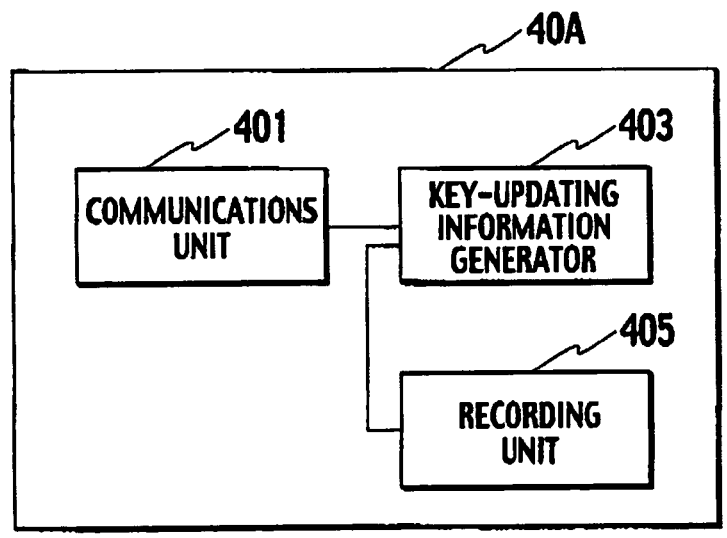
FIG. 5 is a logical block configurational diagram of an external device according to the first embodiment of the present invention.

FIG. 5 is a logical block configurational diagram of the external device 40A. It should be noted that the external device 40B also has a configuration similar to that of the external device 40A. As shown in FIG. 5, the external device 40A is provided with a communications unit 401, a key-updating information generator 403, and a recorder 405.

The communications unit 401 provides a communications interface for connecting to the communications network 1. In addition, the communications unit 401 relays key-updating information d or the like which is transmitted by the key-updating information generator 403.

The key-updating information generator 403 generates key-updating information d used for updating the user decryption key dk of the terminal device 20 by using a master key hk* (specifically, a master key hk*$_{odd}$), which is recorded in the recorder 405.

In addition, in the present embodiment, as described above, the external device 40A is associated with the odd-numbered updates of the decryption key dk.

That is, the key-updating information generator 403 generates key-updating information d used for updating the decryption key dk based on the number of updates of the decryption key dk and the stored master key hk* (specifically, the master key hk*$_{odd}$). Specifically, the key-updating information generator 403 generates key-updating information d based on an instruction from the terminal device 20 in a case of the odd-numbered update of the decryption key dk. In the present embodiment, the key-updating information generator 403 configures a key-updating information generator.

In addition, the key-updating information generator 403 can transmit external device identification information for uniquely identifying the external device 40A in response to a request from the terminal device 20 (the update unit 205). It should be noted that, as the external device identification information, for example, device type information and a production serial number of the external device 40A can be used.

The recorder 405 records a master key hk* (specifically, a master key hk*$_{odd}$). It should be noted that the master key hk* is preferably recorded in a tamper-proof region of the recorder 405.

(Operations of Key-Insulated Cryptosystem)

Next, by referring to FIGS. 6 to 8, operations of the key-insulated cryptosystem according to the present embodiment will be described.

In the key-insulated cryptosystem according to the present embodiment, the once-generated user public key pk of the terminal device 20 is not changed, but only the decryption key dk is updated for every predetermined time period.

In addition, in the present embodiment, the description will be made by assuming that an update interval of the decryption key dk is half a day (a predetermined time period) and that a user of the terminal device 20 uses the key-insulated cryptosystem for N days.

The user of the terminal device 20 alternately uses the external device 40A which is installed at the user's home RG, and the external device 40B which is installed at the office OF, and carries out an update of the decryption key dk every half a day.

(1) Storage of Master Key

Figure 6:
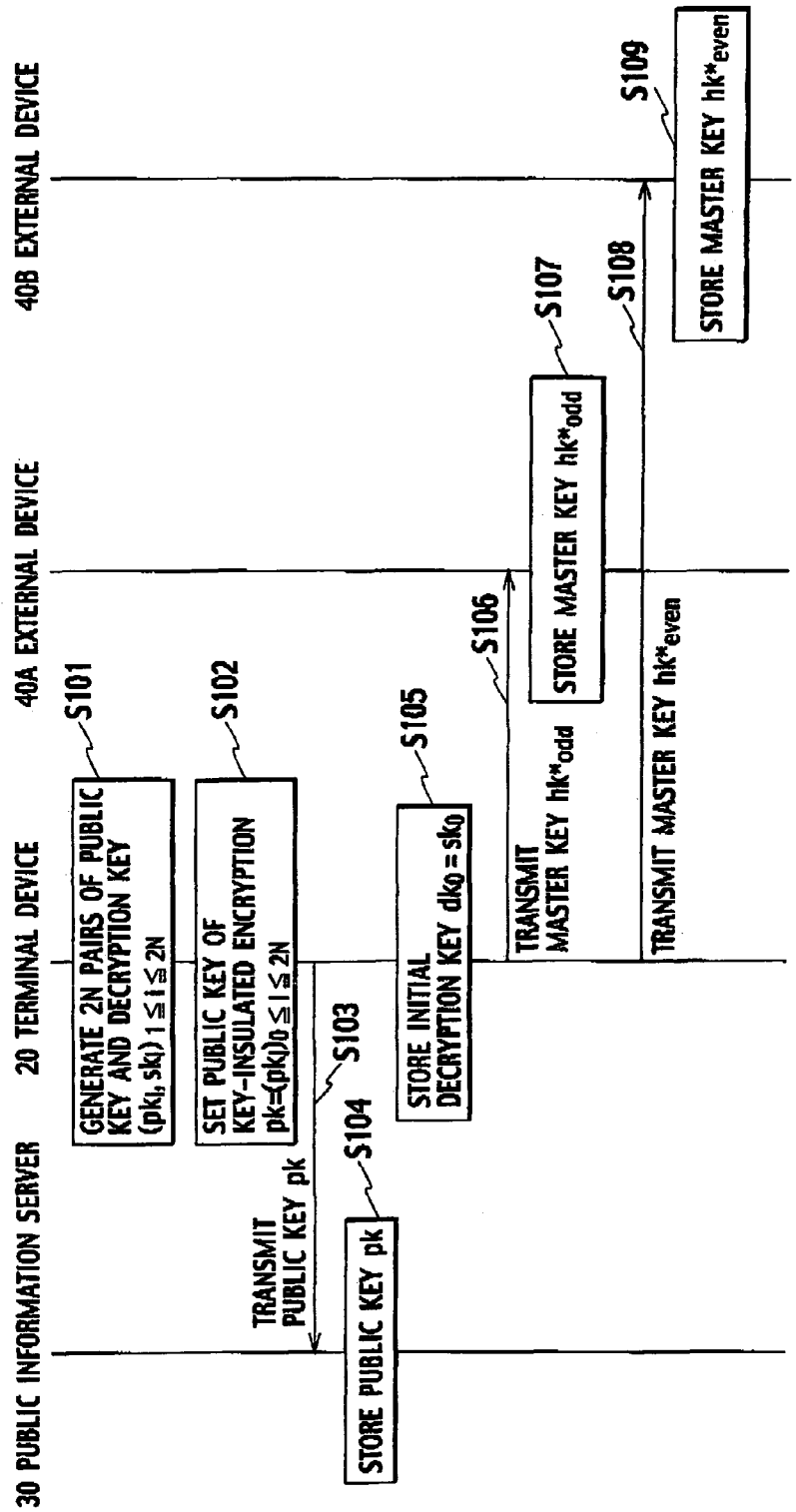
FIG. 6 is an operational flowchart of the key-insulated cryptosystem according to the first embodiment of the present invention.

FIG. 6 shows an operational flow from the time when the terminal device 20 generates master keys hk* (a master key hk*$_{odd}$ and a master key hk*$_{even}$) to the time when the generated master keys hk* are stored in the external devices 40A and 40B.

In Step S101, the terminal device 20 generates a predetermined number of pairs of a public key and a secret key by using general public key encryption (for example, RSA encryption and ElGamal encryption).

Specifically, the terminal device 20 generates 2N pairs of a public key and a secret key $((pk_i, sk_i)_{1 \leq i \leq 2N})$ corresponding to utilization for N days.

In Step S102, the terminal device 20 sets the public key $(pk_i)_{0 \leq i \leq 2N}$ as a user public key pk of the terminal device 20 in the key-insulated cryptosystem.

In Step S103, the terminal device 20 transmits the public key pk to the public information server 30.

In Step S104, the public information server 30 stores the public key pk, which is received from the terminal device 20, in the public information database 305.

In Step S105, the terminal device 20 stores $dk_0=sk_0$ as an initial decryption key in the storage unit 207.

In Step S106, the terminal device 20 sets a secret key sk=(ski) (i=odd number and $1 \leq i \leq N$) as a master key $hk^*_{odd}$ of the external device 40A, and transmits the master key $hk^*_{odd}$ to the external device 40A.

In Step S107, the external device 40A stores the master key $hk^*_{odd}$ in the recorder 405.

In Step S108, the terminal device 20 sets a secret key sk=(ski) (i=even number and $1 \leq i \leq N$) as a master key $hk^*_{even}$ of the external device 40B, and transmits the master key $hk^*_{even}$ to the external device 40B.

In Step S109, the external device 40B stores the master key $hk^*_{even}$ in the recorder 405.

(2) Update of Decryption Key dk

Figure 7:
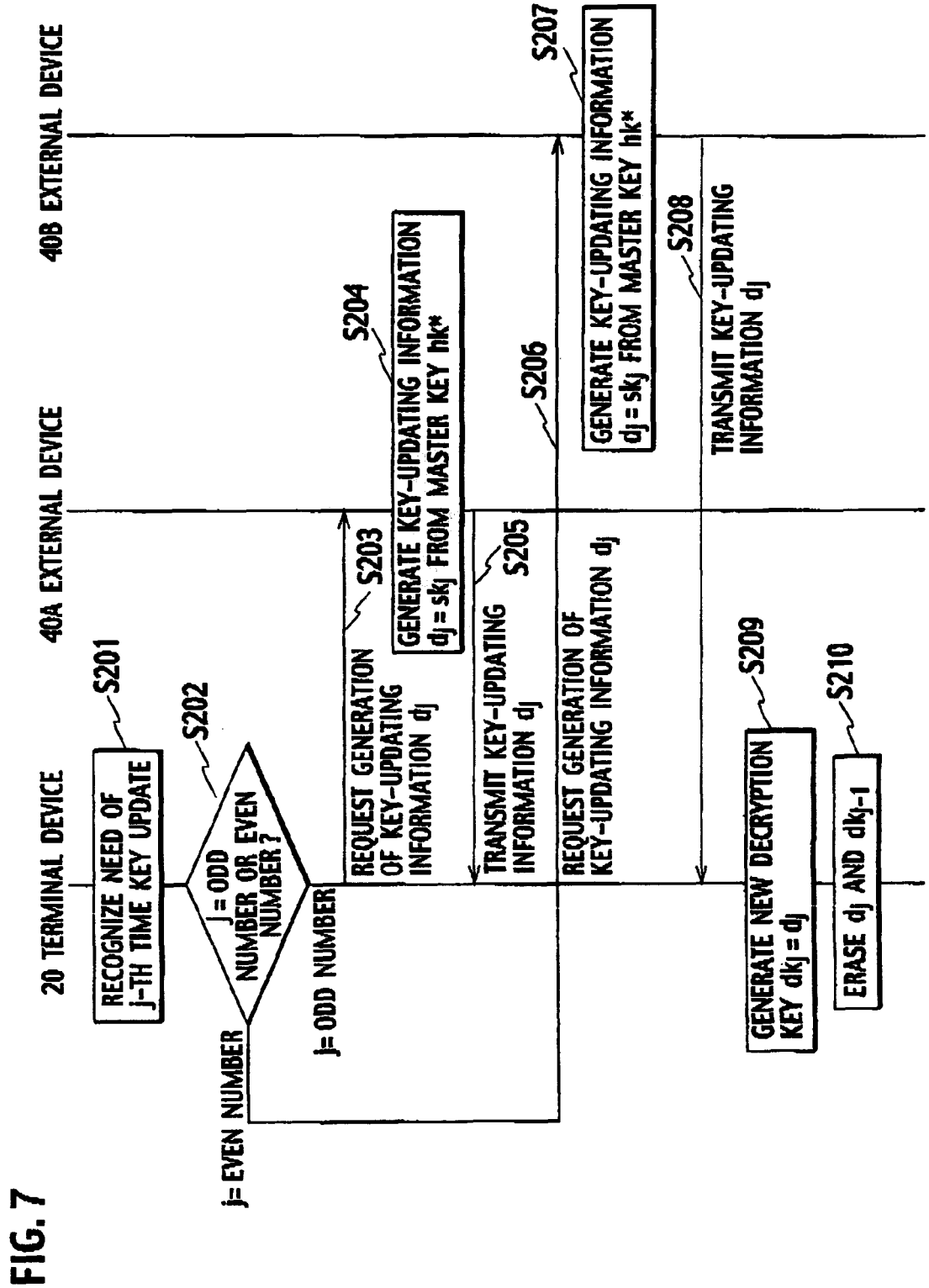
FIG. 7 is an operational flowchart of the key-insulated cryptosystem according to the first embodiment of the present invention.

FIG. 7 shows an operational flow along which the terminal device 20 updates the decryption key dk. As shown in FIG. 7, in Step S201, the terminal device 20 determines that a predetermined time period (half a day) has passed since the last update of the decryption key dk, and recognizes that the j-th time update of the decryption key dk is needed.

In Step S202, the terminal device 20 determines whether the j-th time update of the decryption key dk is odd-numbered or even-numbered.

In a case where the update of the decryption key dk is odd-numbered ("j=odd number" in Step S202), the terminal device 20 requests the external device 40A to generate key-updating information d needed for updating the decryption key dk (specifically, the decryption key $dk_{j-1}$) in Step S203.

It should be noted that the user of the terminal device 20 connects the terminal device 20 to the external device 40A prior to the processing in Step S203.

In addition, along with the processing of the terminal device 20 in Step S203, it may be determined whether or not the external device 40A is an external device which should be used for the j-th time (odd-numbered) update of the decryption key dk, by obtaining external device identification information from the external device 40A for uniquely identifying the external device 40A.

In Step S204, the external device 40A generates key-updating information $d_j=sk_j$ by using the master key $hk^*_{odd}$ which is stored in the recorder 405, and period information j which is associated with the fact that it is the j-th time update of the decryption key dk. It should be noted that a specific method of generating the key-updating information $d_j$ follows the method disclosed in the above-described Reference Document 1 and the like.

In Step S205, the external device 40A transmits the generated key-updating information $d_j$ to the terminal device 20.

On the other hand, in a case where the update of the decryption key dk is even-numbered ("j=even number" in Step S202), the terminal device 20 requests the external device 40B to generate key-updating information d needed for updating the decryption key dk (specifically, the decryption key $dk_{j-1}$) in Step S206.

It should be noted that the user of the terminal device 20 connects the terminal device 20 to the external device 40B prior to the processing in Step S206.

In addition, along with the processing in Step S206, it may be determined whether or not the external device 40B is an external device which should be used for the j-th time (even-numbered) update of the decryption key dk, by obtaining external device identification information from the external device 40B for uniquely identifying the external device 40B.

In Step S207, the external device 40B generates key-updating information $d_j=sk_j$ by using the master key $hk^*_{even}$ which is stored in the recorder 405, and period information j which is associated with the fact that it is the j-th time update of the decryption key dk.

In Step S208, the external device 40B transmits the generated key-updating information $d_j$ to the terminal device 20.

In Step S209, the terminal device 20 generates a decryption key $dk_j=d_j$ by using the key-updating information $d_j$ and the period information j, which are received from the external device 40A or the external device 40B. A specific method of generating the key-updating information $d_j$ follows the method disclosed in the above-described Reference Document 1 and the like.

In Step S210, the terminal device 20 erases the key-updating information $d_j$ and the old decryption key dk (specifically, the decryption key $dk_{j-1}$) from the storage unit 207.

(3) Transmission and Reception of Ciphertext

Figure 8:
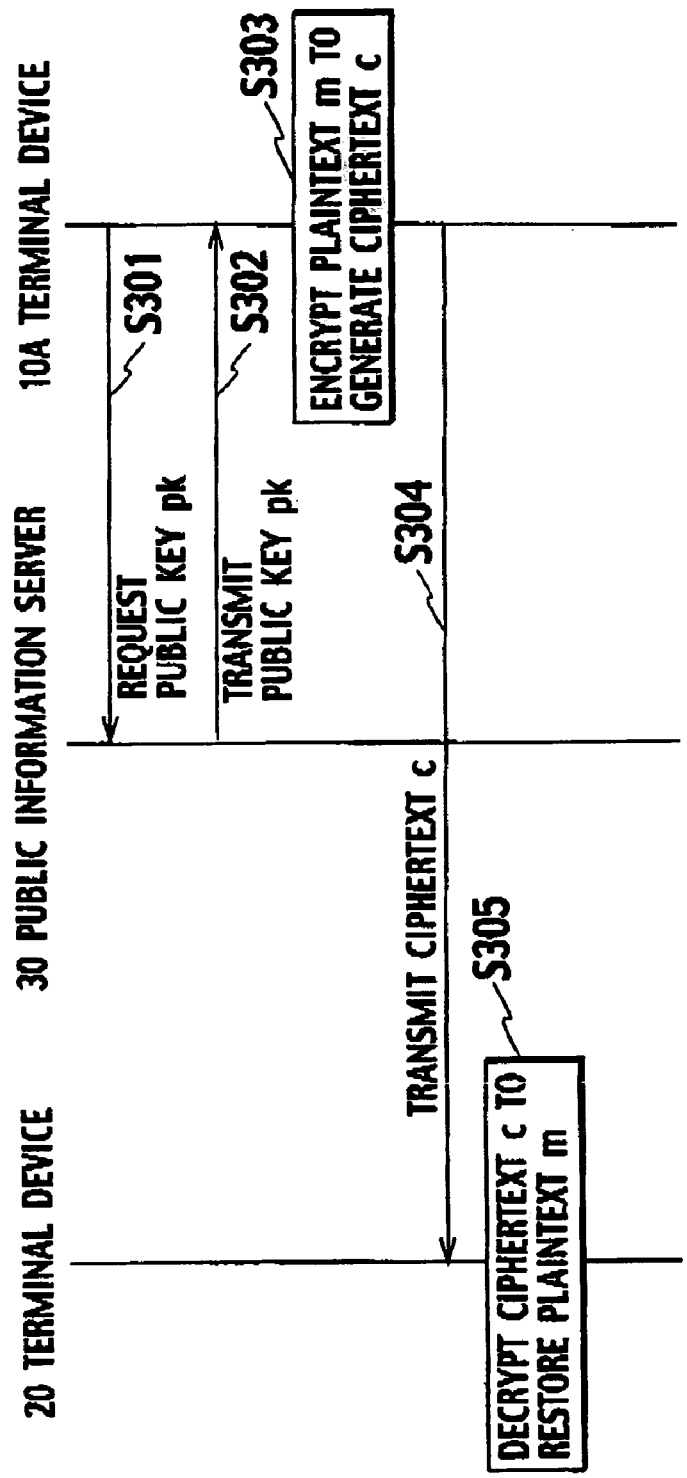
FIG. 8 is an operational flowchart of the key-insulated cryptosystem according to the first embodiment of the present invention.

FIG. 8 shows an operational flow along which the terminal device 10A transmits a ciphertext c to the terminal device 20 and the terminal device 20 decrypts the ciphertext c. As shown in FIG. 8, in Step S301, the terminal device 10A requests the public information server 30 to send the user public key pk of the terminal device 20.

In Step S302, in response to the request from the terminal device 10A, the public information server 30 transmits the user public key pk of the terminal device 20 to the terminal device 10A.

In Step S303, the terminal device 10A selects a public key $pk_i$ corresponding to a period i, during which the ciphertext c is generated, from the received public keys pk. The terminal device 10A then encrypts a plaintext m, which contains the contents of a message to be transmitted to the user of the terminal device 20, by using the public key $pk_i$ and a predetermined encryption algorithm (for example, RSA encryption), and generates a ciphertext c.

In Step S304, the terminal device 10A transmits the generated ciphertext C to the terminal device 20.

In Step 305, the terminal device 20 decrypts the received ciphertext c by using the decryption key dk which is stored in the storage unit 207, and the predetermined encryption algorithm (for example, RSA encryption), and restores the plaintext m.

(Operations and Effects)

According to the key-insulated cryptosystem in accordance with the present embodiment as described above, the number of updates of the decryption key dk is associated with a plurality of different external devices, i.e., the external devices 40A and 40B. A different piece of master keys (a master key $hk^*_{odd}$ and a master key $hk^*_{even}$) is stored in each of the external devices.

That is, the user of the terminal device 20 can selectively use the external devices which are installed at a plurality of different places (the user's home RG and the office OF), by connecting the external device associated with the number of updates of the decryption key dk (for example, connecting the external device 40A in a case of an odd-numbered time update of the decryption key dk).

In addition, since a different master key hk* (the master key $hk^*_{odd}$ or the master key $hk^*_{even}$) is stored in each of the external devices, even in a case where any of the external devices is lost or stolen, security of the key-insulated cryptosystem can be maintained because a certain number of decryption keys dk cannot be obtained.

That is, according to the key-insulated cryptosystem in accordance with the present embodiment, an update of the decryption key dk can be more flexibly carried out without deteriorating the security of the encrypted information (for example, the ciphertext c).

Second Embodiment

Next, the second embodiment of the present invention will be described. Hereinafter, portions different from those of the above-described first embodiment will be mainly described.
(Logical block configuration of key-insulated cryptosystem)

Logical block configurations of a terminal device 10A (10B), a terminal device 20, a public information server 30, and an external device 40A (40B), which configure a key-insulated cryptosystem according to the present embodiment, are similar to those of the terminal device 10A (10B), the terminal device 20, the public information server 30, and the external device 40A (40B) according to the first embodiment of the present invention.

(1) Terminal Device 10A

In the present embodiment, an encryptor 105 encrypts a plaintext m by using the following public key pk. Firstly, the encryptor 105 uses a public key $pk_{j-1}$ (a first public key) corresponding to a decryption key $dk_{j-1}$ (a post-first-update terminal secret key) which is updated by using key-updating information (for example, key-updating information $d_{j-1}$) generated by the external device 40A (a first external device).

Secondly, the encryptor 105 uses a public key $pk_j$ (a second public key) corresponding to a decryption key $dk_j$ (a post-second-update terminal secret key) which is updated by using key-updating information (for example, key-updating information $d_j$) generated by the external device 40B (a second external device) at the timing of an update (j) immediately once the decryption key $dk_{j-1}$ is generated.

The encryptor 105 encrypts a plaintext m (information) by using the both public keys which are the public key $pk_{j-1}$ and the public key $pk_j$.

(2) Terminal Device 20

In the present embodiment, the decryptor 209 decrypts a ciphertext c by using the both decryption keys which are the decryption key $dk_{j-1}$ (the post-first-update terminal secret key) and the decryption key $dk_j$ (the post-second-update terminal secret key). The decryptor 209 can store the plaintext m, which is restored by decrypting the ciphertext c, in the storage unit 207, and can output the ciphertext c to the output unit 211.

(Operations of Key-Insulated Cryptosystem)

Next, by referring to FIG. 9, operations of the key-insulated cryptosystem according to the present embodiment will be described.

In the key-insulated cryptosystem according to the present embodiment, as in the case of the above-described first embodiment, the once-generated user public key pk of the terminal device 20 is not changed, but only the decryption key dk is updated for every predetermined time period.

In addition, the description will be made by assuming that an update interval of the decryption key dk is half a day (a predetermined time period) and that the user of the terminal device 20 uses the key-insulated cryptosystem for N days.

The user of the terminal device 20 alternately uses the external device 40A (the first external device) which is installed at the user's home RG, and the external device 40B (the second external device) which is installed at the office OF, and carries out an update of the decryption key dk every half a day.

(1) Storage of Master Key

An operational flow of storing a master key according to the present embodiment is similar to that of the above-described first embodiment (see, FIG. 6).

(2) Update of Decryption Key dk

Figure 9:
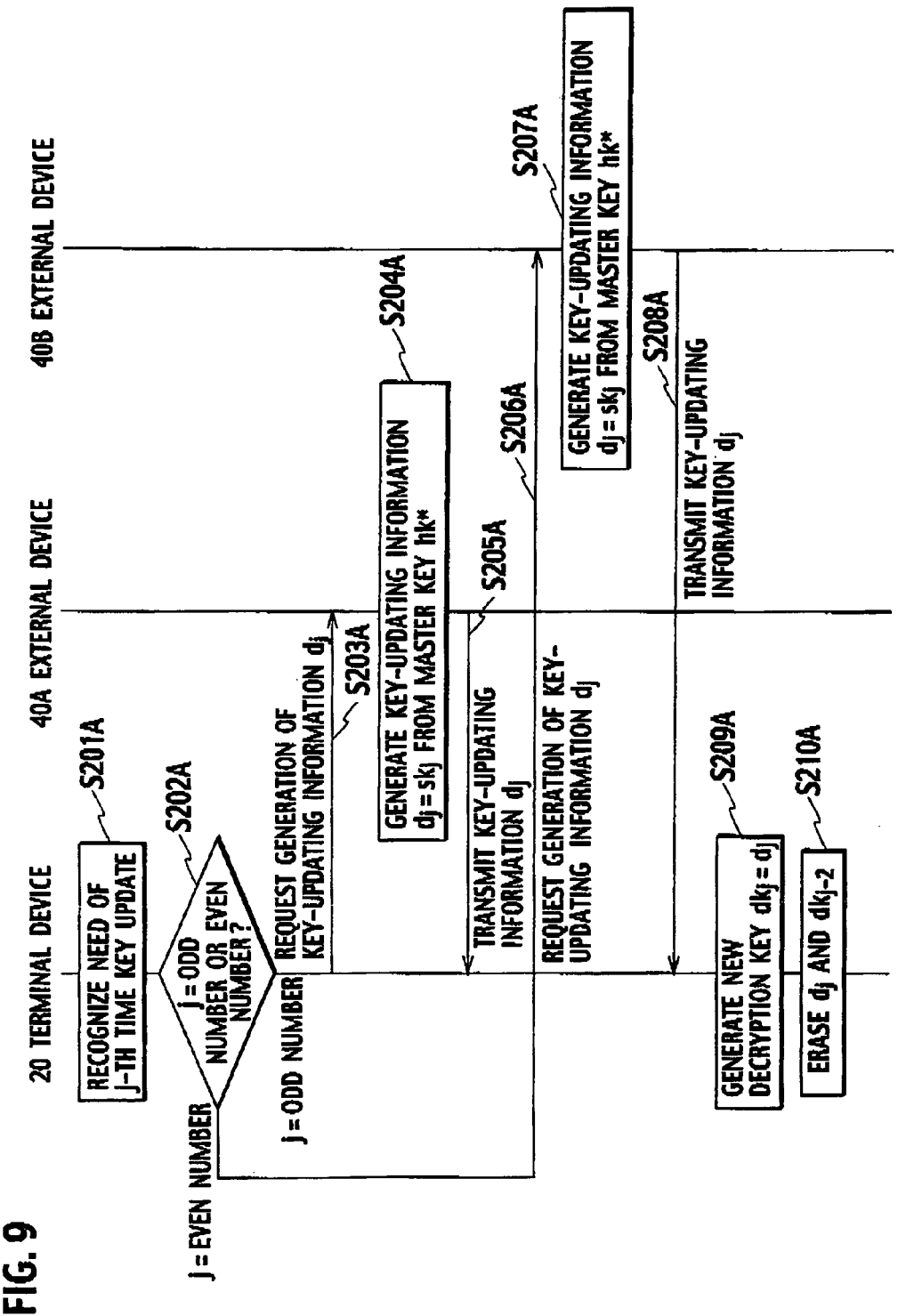
FIG. 9 is an operational flowchart of a key-insulated cryptosystem according to a second embodiment of the present invention.

FIG. 9 shows an operational flow along which the terminal device 20 updates the decryption key dk. As shown in FIG. 9, processing from Step S201A to S209A is similar to that of the above-described first embodiment (see, FIG. 7).

In Step S210A, the terminal device 20 erases the key-updating information $d_j$ and the old decryption key dk (specifically, the decryption key $dk_{j-2}$) from the storage unit 207.

(3) Transmission and Reception of Ciphertext

An operational flow of transmission and reception of a ciphertext according to the present embodiment is similar to that of the above-described first embodiment (see, FIG. 8).

However, in the present embodiment, in Step S303, the terminal device 10A selects, from the received public keys pk, a public key $pk_j$ corresponding to a period j during which the ciphertext c is generated, and a public key $pk_{j-1}$ corresponding to a period j−1 which is immediately before the period of the public key $pk_j$.

Furthermore, the terminal device 10A applies a combination of the public key $pk_{j-1}$ and the public key $pk_j$ to a predetermined encryption algorithm (for example, RSA encryption). The terminal device 10A encrypts the plaintext m which contains the contents of the message to be transmitted to the user of the terminal device 20, by applying the combination of the public key $pk_{j-1}$ and the public key $pk_j$ to the encryption algorithm, so that the ciphertext c is generated.

In addition, in Step S305, the terminal device 20 applies the decryption key $dk_j$ which is stored in the storage unit 207, and the decryption key $dk_{j-1}$ corresponding to a period j−1 which is immediately before the period of the decryption key $dk_j$, to a predetermined encryption algorithm (for example, RSA encryption). The terminal device 20 decrypts the received ciphertext c by applying the combination of the decryption key $dk_j$ and the decryption key $dk_{j-1}$ to the encryption algorithm, so that the plaintext m is restored.

(Operations and Effects)

In the present embodiment, the plaintext m is encrypted by using the both public keys which are the public key $pk_j$ corresponding to the period j during which the ciphertext c is generated, and the public key $pk_{j-1}$ corresponding to the period j−1 which is immediately before the period of the public key $pk_j$. In addition, the ciphertext c which is encrypted from the plaintext m cannot be decrypted, unless using the both decryption keys which are the decryption key $dk_j$ and the decryption key $dk_{j-1}$ corresponding to the period j−1 which is immediately before the period of the decryption key $dk_j$.

For this reason, even in a case where any of the external devices 40A and 40B is lost or stolen, an attacker who obtains the external device cannot decrypt the ciphertext c at all even by using the external device. Therefore, the security of the key-insulated cryptosystem can be further improved.

In addition, even in a case where the attacker uses the key-updating information d stored in the external device and the user decryption key dk of the terminal device 20 exposed at a specific time, it is possible to guarantee the security of decryption keys dk, which are generated in a period including the specific time and in periods before and after the period, throughout those periods.

That is, according to the key-insulated cryptosystem in accordance with the present embodiment, an update and encryption processing can be more flexibly carried out without deteriorating the security of the encrypted information (for example, the ciphertext c).

Third Embodiment

Next, a third embodiment of the present invention will be described. In the above-described first and second embodiments, the key-updating information d for updating a decryption key dk (a terminal secret key) is generated by invariably alternately using two external devices (the external devices 40A and 40B). However, in the present embodiment, the two external devices do not have to be alternately used. That is, in the present embodiment, consideration is made for improving convenience for users, while a certain level of the security of a key-insulated cryptosystem is guaranteed.

Specifically, in the present embodiment, a decryption key dk is updated every day. A user of a terminal device 20 updates the decryption key dk every day by using an external device 40B, which is installed at an office OF. Furthermore, the user of the terminal device 20 updates the decryption key dk only once in a month by using the external device 40A, which is installed at a user's home RG.

The user of the terminal device 20 does not have to update the decryption key dk by invariably alternately using the external devices 40A and 40B. Therefore, the user can keep the external device 40A, which is used only once in a month, in a physically safe place such as a storage (not shown) at the user's home RG.

Hereinafter, portions different from the first or second embodiment will be mainly described, and the description of portions similar to the first or second embodiment will be properly omitted.

(Logical Block Configuration of Key-Insulated Cryptosystem)

Logical block configurations of a key-insulated cryptosystem according to the present embodiment are similar to the logical block configurations of the key-insulated cryptosystem according to the first and second embodiments (see FIGS. 2 to 5).

In the present embodiment, the external device 40A (a first external device) is used only once in a month to generate key-updating information δi. That is, the external device 40A is associated with a thing that is used every one month (a first cycle).

On the other hand, the external device 40B (a second external device) is used every day to generate the key-updating information δi except for the case where the external device 40A is used. That is, the external device 40B is associated with a one-day cycle (a second cycle). In this manner, the cycle in which the external device 40B is used to generate the key-updating information δi is set shorter than the cycle (one month cycle) in which the external device 40A is used to generate the key-updating information δi.

In the present embodiment, based on a bilinear mapping satisfying a predetermined condition, generation of the key-updating information δi, generation of a ciphertext c, and restoration of a plaintext m are carried out. Specifically, G1 and G2 are set as a group where an order is q, and g is set as a generator of G1. Furthermore, e:G1×G2→G2 is set as the bilinear mapping satisfying an equation 1.

$$e(g^a, g^b) = e(g,g)^{ab} \quad \text{(equation 1)}$$

In addition, G and H are set as hush functions shown in an equation 2.

$$G:G2 \to \{0,1\}^n, H:\{0,1\}^* \to G1 \quad \text{(equation 2)}$$

Furthermore, s1 and s2 are selected at random from a set Zq which is a set of integers 1 to q−1. The selected s1 is stored as a master key 1 in the external device 40B. In addition, the selected s2 is stored as a master key 2 in the external device 40A.

In addition, in the present embodiment, a date i is used for generation (operation) of an initial decryption key $dk_0$ and a ciphertext c. The date i is expressed in a form of "year/month/day". For example, in a case of Aug. 1, 2006, it is expressed as "2006/08/01".

Next, a functional block carrying out processing different from that of the first or second embodiment will be described. An updater 205 of the terminal device 20 according to the present embodiment selects one of the external devices 40A and 40B depending on an update period of a decryption key dk (a terminal secret key). Specifically, a decryption key dk on the first day of every month is generated by updating a decryption key dk on the previous day, e.g., the last day of the previous month, by using the master key 2 which is stored in the external device 40A.

On the other hand, a decryption key dk on a day other than the first day of every month is generated by updating a decryption key dk on the previous day by using the master key 1 which is stored in the external device 40B.

The updater 205 generates an initial decryption key $dk_0$ by using, for example, an equation 3 in a case where utilization starts from Aug. 1, 2006 (an update of a decryption key dk starts from the following day).

$$dk_0 = H(2006/08/01)^{s1} \cdot H(2006/08/01)^{s2} \quad \text{(equation 3)}$$

In addition, the updater 205 generates a decryption key $dk_i$ of the date i by using an equation 4 including the decryption key $dk_{i-1}$ on the previous day and the key-updating information δi.

$$dk_i = \delta i \cdot dk_{i-1} \quad \text{(equation 4)}$$

It should be noted that the updater 205 erases the decryption key $dk_{i-1}$ on the previous day and the key-updating information δi from a storage unit 207 once the decryption key $dk_i$ is generated.

In addition, on a public information server 30 according to the present embodiment, the following information is published as a user public key $pk_{all}$ of the terminal device 20.

$$pk_{all} = <q, G1, G2, g, e, n, h1, h2, G, H>$$

It should be noted that h1 and h2 are obtained by an equation 5. In addition, the public key $pk_{all}$ is commonly used in all periods.

$$h1 = g^{s1}$$

$$h2 = g^{s2} \quad \text{(equation 5)}$$

In addition, a key-updating information generator 403 of the external devices 40A and 40B generates key-updating information δi by using the hash function H which is determined based on the above-described bilinear mapping. Specifically, in a case where a date i is the first day of a month (for example, Sep. 1, 2006), the key-updating information generator 403 generates the key-updating information δi by using an equation 6.

$$\delta i = H(\text{a date on the first day of the previous month})^{-s2} \cdot H(i)^{s2} \quad \text{(equation 6)}$$

That is, in a case where the date i is the first day of the month, the key-updating information δi is generated by using the master key 2 (s2) which is stored in the external device 40A.

In addition, in a case where the date i is the second day of the month (for example, Sep. 2, 2006), the key-updating information generator 403 generates the key-updating information δi by using an equation 7.

$$\delta i = H(\text{a date of two days before})^{-s1} \cdot H(i)^{s1} \quad \text{(equation 7)}$$

That is, in a case where the date i is the second day of the month, the key-updating information δi is generated by using the master key 1 (s1) which is stored in the external device 40B. It should be noted that "a date of two days before" in the equation 7 means Aug. 31, 2006 in a case where the date i is Sep. 2, 2006.

Furthermore, in a case where the date i is a day other than the first or second day, the key-updating information generator 403 generates the key-updating information δi by using an equation 8.

$$\delta i = H(\text{a date on the previous day})^{-s1} \cdot H(i)^{s1} \quad \text{(equation 8)}$$

That is, in a case where the date i is a day other than the first or second day, the key-updating information δi is generated by using the master key 1 (s1) which is stored in the external device 40B.

In addition, an encryptor 105 of a terminal device 10A (10B) according to the present embodiment encrypts a plaintext m by using an equation 9 to generate a ciphertext c.

$$c = <i, c0, c1> \quad \text{(equation 9)}$$

Here, c0 can be obtained by using an equation 10.

$$c0 = g^r \quad \text{(equation 10)}$$

Furthermore, the encryptor 105 encrypts a plaintext m by using the public key $pk_{all}$ and update period information corresponding to an update period of the decryption key dk to generate a ciphertext c. Specifically, in a case where the date i is the first day of a month, the encryptor 105 generates a ciphertext c1 by using an equation 11.

$$c1 = m \text{ XOR } G((e(h1, H(\text{a date on the previous day})) \cdot e(h2, H(i)))^r) \quad \text{(equation 11)}$$

In addition, in a case where the date i is a day other than the first day of the month, the encryptor 105 generates a ciphertext c1 by using an equation 12.

$$c1 = m \text{ XOR } G((e(h1, H(i)) \cdot e(h2, H(\text{a date on the first day of this month})))^r) \quad \text{(equation 12)}$$

That is, in a case where the date i is the first day of a month (for example, Sep. 1, 2006), the encryptor 105 uses the date on the previous day (Aug. 31, 2006) as update period information corresponding to an update period of the decryption key dk. In addition, in a case where the date i is a day other than the first day of a month (for example, Sep. 3, 2006), the encryptor 105 uses a date on the first day of the month (Sep. 1, 2006) as update period information corresponding to an update period of the decryption key dk. It should be noted that, in the present embodiment, a plaintext m is assumed to be a bit string of n bits.

In addition, a decryptor 209 of the terminal device 20 according to the present embodiment decrypts the ciphertext c by using an equation 13 to restore the plaintext m, based on the public key $pk_{all}$, the date i, and the ciphertext c (=<i, c0, c1>).

$$m = c1 \text{ XOR } G(e(c0, dk_i)) \quad \text{(equation 13)}$$

(Operations of Key-Insulated Cryptosystem)

Next, by referring to FIGS. 10 to 12, operations of the key-insulated cryptosystem according to the present embodiment will be described. FIGS. 10 to 12 respectively correspond to FIGS. 6 to 8 showing operational flows of the key-insulated cryptosystem according to the first embodiment. Specifically, FIGS. 10 to 12 respectively show operations of storing a master key, operations of updating a decryption key dk, and operations of transmitting or receiving a ciphertext.

Hereinafter, portions different from the above-described key-insulated cryptosystem according to the first embodiment will be mainly described.

(1) Storage of Master Key

As shown in FIG. 10, in Step S1101, the terminal device 20 selects s1 and s2 at random from a set Zq.

In Step S1102, the terminal device 20 transmits the selected s1 as a master key 1 to the external device 40A.

In Step S1103, the external device 40A stores the master key 1 in the recorder 405.

In Step S1104, the terminal device 20 transmits the selected s2 as a master key 2 to the external device 40S.

In Step S1105, the external device 40B stores the master key 2 in the recorder 405.

In Step S1106, the terminal device 20 determines a public key $dk_{all}$ (=<q, G1, G2, g, e, n, h1, h2, G, H>).

In Step S1107, the terminal device 20 transmits the public key $pk_{all}$ to the public information sever 30.

In Step S1108, the public information server 30 stores the public key $pk_{all}$ received from the terminal device 20 in public information database 305.

In Step S1109, the terminal device 20 stores an initial decryption key $dk_0$ in the storage unit 207. The initial decryption key $dk_0$ is generated as described above by using the equation 3.

(2) Update of Decryption Key dk

As shown in FIG. 11, in Step S1201, the terminal device 20 determines that a predetermined time period (one day) has passed since the previous update of the decryption key dk, and recognizes that i-th time update of the decryption key dk is needed.

In Step S1202, the terminal device 20 determines a current date i. In a case where the date i is the first day of a month (for example, Sep. 1, 2006), the terminal device 20 requests the external device 40B to generate the key-updating information δi in Step S1203.

In Step S1204, the external device 40B generates the key-updating information δi by using the above-described equation 6. In Step S1205, the external device 40B transmits the generated key-updating information δi to the terminal device 20.

In addition, in a case where the date i is the second day of a month (for example, Sep. 2, 2006), the terminal device 20 requests the external device 40A to generate the key-updating information δi in Step S1206.

In Step S1207, the external device 40A generates the key-updating information δi by using the above-described equation 7. In Step S1208, the external device 40A transmits the generated key-updating information δi to the terminal device 20.

Furthermore, in a case where the date i is a day other than the first or second day of a month, the terminal device 20 requests the external device 40A to generate the key-updating information δi in Step S1209.

In Step S1210, the external device 40A generates the key-updating information δi by using the above-described (equation 8). In Step S1211, the external device 40A transmits the generated key-updating information δi to the terminal device 20.

In Step S1212, the terminal device 20 generates the decryption key $dk_i$ by using the above-described equation 4, based on the key-updating information δi received from the external device 40A or 40B.

In Step S1213, the terminal device 20 erases the key-updating information δi and the decryption key $dk_{i-1}$ from the storage unit 207.

(3) Transmission and Reception of Ciphertext

Processing in Steps S1301 and S1302 shown in FIG. 12 is similar to the processing in Steps S301 and S302 shown in FIG. 8. In Step S1303, the terminal device 10A selects r at random from the set Zq.

In a case where a current date i, e.g., timing of generating the ciphertext c, is the first day of a month, the terminal device 10A generates a ciphertext c by using the above-described equation 11 in Step S1304.

In addition, in a case where the current date i is a day other than the first day of a month, the terminal device 10A generates a ciphertext c by using the above-described equation 12 in Step S1305.

In Step S1306, the terminal device 10A transmits the generated ciphertext c to the terminal device 20.

In Step S1307, the terminal device 10A decrypts the received ciphertext c by using the above-described equation 13 to restore the plaintext m.

(Operations and Effects)

According to the key-insulated cryptosystem according to the present embodiment, generation of the key-updating information δi, generation of the ciphertext c, and restoration of the plaintext m are carried out, based on the bilinear mapping satisfying a predetermined condition. In addition, as shown in the equation 11 and the equation 12, the date used for generating the key-updating information δi (a date on the previous day or a date on the first day of the month) varies depending on an update period of the decryption key dk. Therefore, utilization frequencies of the external devices 40A and 40B can be made different.

Specifically, since it suffices that the external device 40A is used only once in a month, the user of the terminal device 20 who updates the decryption key dk by using the external devices 40A and 40B can keep the external device 40A in a physically safe place such as a storage (not shown) at the user's home RG except for the time when it is used.

That is, the user of the terminal device 20 almost does not need to recognize that the external devices 40A and 40B are alternately used to update the decryption key dk. For this reason, the user may concentrate only on managing the external device 40B which is used almost everyday, thereby improving convenience.

In addition, when compared with the key-insulated cryptosystem according to the first embodiment in which the external devices 40A and 40B are invariably alternately used, although the security of encrypted communications is reduced, the convenience for the user can be improved, while guaranteeing the security which is higher than the conventional key-insulated cryptosystem.

Other Embodiment

As described above, the contents of the present invention have been disclosed by one embodiment of the present invention. However, it should not be understood that descriptions and drawings constituting part of this disclosure limit the present invention. From this disclosure, a various alternative embodiments will be apparent to those who are skilled in the art.

For example, in the above-described embodiments of the present invention, two external devices (external devices 40A and 40B) are associated with an odd-numbered time update of the decryption key dk and an even-numbered time update of the decryption key dk. However, the number of the external devices may be three or more instead of two.

In a case where the number of the external devices is three, as in the case of the above-described embodiments, a different master key hk* is stored in each of the external devices (for example, external devices #1 to #3). In addition, each of the external devices is associated with the number of updates of the decryption key dk. For example: the external device #1 is used for the first, fourth, seventh . . . updates of the decryption key dk; the external device #2 is used for the second, fifth, eighth . . . updates of the decryption key dk; and the external device 113 is used for the third, sixth, ninth . . . updates of the decryption key dk.

In addition, in a case where an order of the external devices used for updating the decryption key dk is known in advance, an order of using the external devices may be irregular.

The user (the terminal device 20) requests the external devices to generate key-updating information d in accordance with a predetermined order of the three external devices (the external device #1, the external device #2, and the external device #3).

In addition, functions of respective logical blocks (excepting specific blocks such as a storage unit) of the terminal device 10A (10B), the terminal device 20, the public information server 30, and the external device 40A (40B) as described above can be provided as a program.

In this manner, the present invention apparently includes various embodiments which are not described herein. Thus, a technical scope of the present invention is defined only by invention-specific matters according to the scope of patent claims which are appropriate in light of the foregoing description.

What is claimed is:

1. A key-updating method in a key-insulated cryptosystem that includes terminal devices each for carrying out encryption processing, and external devices each for updating a terminal secret key stored in each of the terminal devices and for storing secret information that is a secret key selected from a predetermined number of pairs of a public key and a secret key, wherein the plurality of external devices are associated with a number of times the terminal secret key has been updated, and a different piece of secret information is stored in each of the external devices, the key-updating method comprising:

selecting one external device of the external devices based on the number of times the terminal secret key has been updated;

causing the selected one external device to generate key-updating information used for updating the terminal secret key, based on the number of times the terminal secret key has been updated and the stored secret information; and causing each terminal device to obtain, from the external devices, external device identification information for uniquely identifying the external devices, wherein, in the step of selecting the one external device, each terminal device determines whether or not an external device connected to the terminal device is an external device to which a request for an update of the terminal secret key should be made, based on the external device identification information and the number of times the terminal secret key has been updated.

2. A key-insulated cryptosystem, comprising:

terminal devices each for carrying out encryption processing; and external devices each for updating a terminal secret key stored in each of the terminal devices and for storing secret information that is a secret key selected from a predetermined number of pairs of a public key and a secret key, wherein the plurality of external devices are associated with a number of times the terminal secret key has been updated, a different piece of secret information is stored in each of the external devices, wherein each terminal device includes an external device identification information obtaining unit configured to obtain external device identification information for uniquely identifying the external devices, from the external devices; and an external device determination unit configured to select one external device of the external devices by determining whether or not an external device connected to the terminal device is an external device to which a request for an update of the terminal secret key should be made, based on the external device identification information and the number of times the terminal secret key has been updated, and the external device comprises a key-updating information generator configured to generate key-updating information used for updating the terminal secret key based on the number of times the terminal secret key has been updated and the stored secret information.

3. A terminal device, which is connected to external devices each storing secret information that is a secret key selected from a predetermined number of pairs of a public key and a secret key, and which is used in a key-insulated cryptosystem, wherein the plurality of external devices are associated with a number of times a terminal secret key has been updated, and a different piece of secret information is stored in each of the external devices, the terminal device comprising:

an external device identification information obtaining unit configured to obtain external device identification information for uniquely identifying the external devices, from the external devices; and an external device determination unit configured to select one external device of the external devices by determining whether or not an external device connected to the terminal device is an external device to which a request for an update of the terminal secret key should be made, based on the external device identification information and the number of times the terminal secret key has been updated.

* * * * *